United States Patent [19]

Ortell

[11] 4,106,727

[45] Aug. 15, 1978

[54] AIRCRAFT FOLDING AIRFOIL SYSTEM

[75] Inventor: Alexander Rudolph Ortell, Huntsville, Ala.

[73] Assignee: Teledyne Brown Engineering, a Division of Teledyne Industries, Inc., Huntsville, Ala.

[21] Appl. No.: 795,052

[22] Filed: May 9, 1977

[51] Int. Cl.² .............................................. B64C 3/56
[52] U.S. Cl. ...................................... 244/49; 244/218
[58] Field of Search ........................... 244/218, 46, 49

[56] References Cited

U.S. PATENT DOCUMENTS

| 1,373,934 | 4/1921 | Amici | 244/49 |
|---|---|---|---|
| 1,427,257 | 8/1922 | Bowen et al. | 244/49 |
| 2,596,436 | 5/1952 | Robert | 214/49 |
| 2,810,985 | 10/1957 | Bilder | 244/49 |
| 3,092,355 | 6/1963 | Brown | 244/218 |
| 3,666,210 | 5/1972 | Look et al. | 244/218 |

FOREIGN PATENT DOCUMENTS

737,052   12/1932   France ..................................... 244/218

Primary Examiner—Galen L. Barefoot
Attorney, Agent, or Firm—Beveridge, DeGrandi, Kline & Lunsford

[57] ABSTRACT

A folding airfoil for an aircraft in which the wing or stabilizer airfoil can be folded and contained entirely within the fuselage of the aircraft. The airfoil comprises a series of elongated sheet metal channel sections of generally C-shaped cross section with the cross sectional dimension of successive channels decreasing so that each can nest entirely within an adjacent channel. The channels are each pivotally connected at the root end to the aircraft fuselage structure at spaced intervals along the chord line of the extended airfoil and the end sections of the channels are pivotally connected to each other such that the channels are pivotable between (1) an extended position extending spanwise of the extended airfoil to lie in tandem one behind the other, with adjacent channels partially overlapping and (2) a retracted or folded position in which the channels are nested within the leading edge channel section and lie along the chord line of the extended airfoil along the line of channel root end pivotal connections.

10 Claims, 16 Drawing Figures

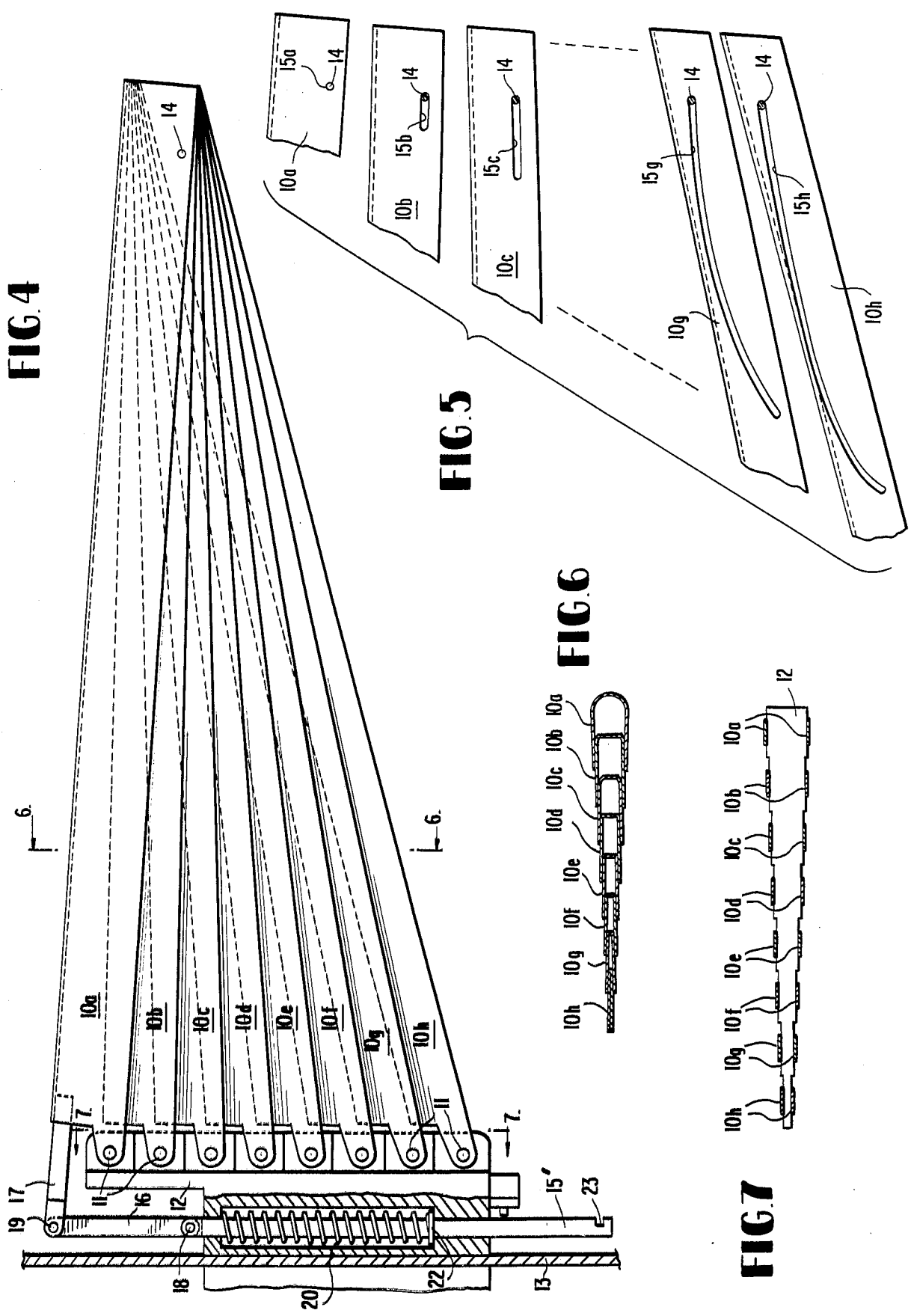

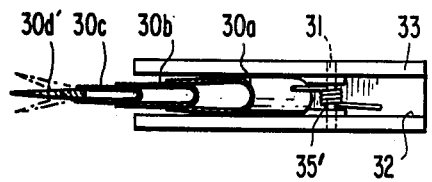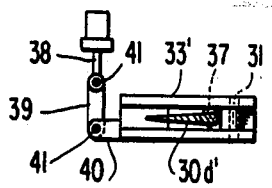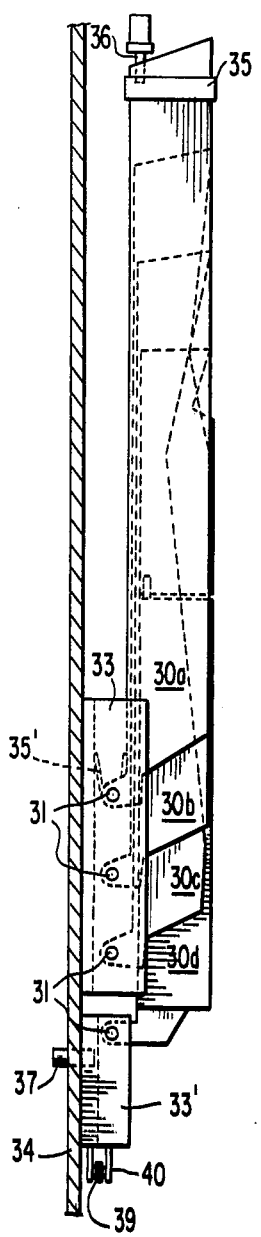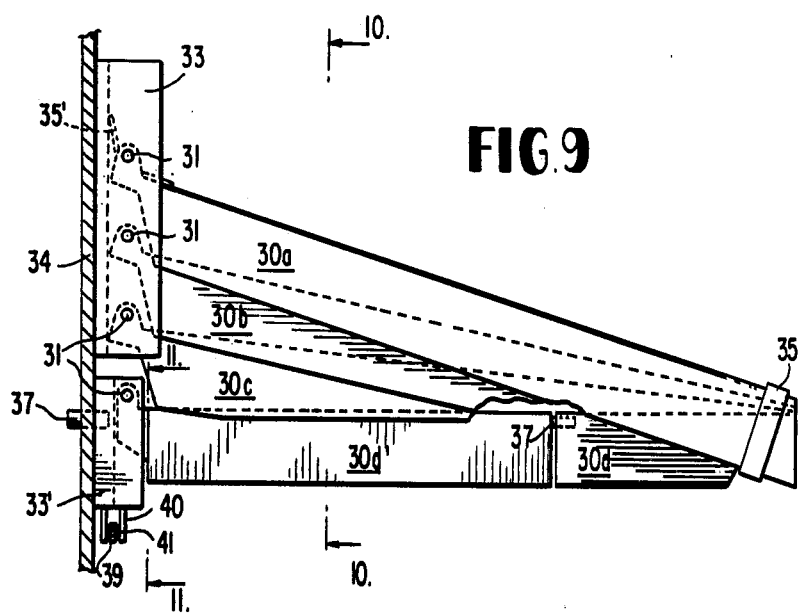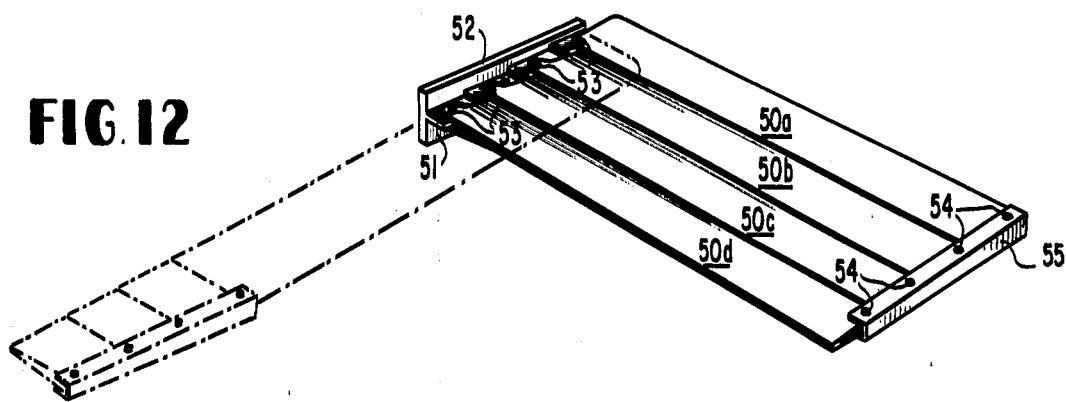

AIRCRAFT FOLDING AIRFOIL SYSTEM

This invention relates to metal airfoil for an aircraft, particularly a wing or stabilizer or control surface, which can be folded from the normal position extending transversely from the aircraft fuselage into a compact, elongated mass of narrow width which can be contained within the aircraft when in the retracted and stowed position. The invention has particular applicability to guided missiles and remote piloted aircraft in which it is desirable to have the wings and stabilizer or control surfaces entirely nest within the fuselage structure for compactness prior to launch. The invention is particularly applicable to tube-launched aerial vehicles or other aerial vehicles which must be entirely contained within the launching tube in the pre-launched condition such that the conventional, protruding wings and tail surfaces cannot be accommodated in the available space.

Various types of folding wings have been suggested for aircraft but the wing structures in the folded position require more space than is available in the aircraft fuselage for storage, particularly in aircraft in which relatively large airfoil areas are required for operation at low speeds of 150 knots or less. Non-rigid folding and collapsible wings of various types have been suggested but these structures suffer from a lack of rigidity, particularly torsional rigidity, and do not have the requisite strength for many flight conditions.

The invention involves an airfoil section such as a wing, in which the section comprises a series of sheet metal channel sections of a C cross section in which each channel will nest entirely within the next forwardly adjacent channel such that in the retracted or stowed condition the cross sectional dimensions of the channel sections can be nested within the envelope of the channel forming the leading edge of the airfoil section. The channels are each pivotally connected at the root end to the structure of the fuselage with the pivotal connections each being spaced apart along the line of the fuselage to extend along the root chord of the airfoil. In the extended position the channel sections extend spanwise of the airfoil section transversely of the aircraft fuselage with the adjacent channel sections partially overlapping to provide the airfoil surface and the tip ends of the channel sections are movably connected to one another such that in the retracted or stowed position the channel sections may be rotated about their respective root pivotal attachments such that the cross sectional envelopes of all channel sections are nested within one another and extend in a line along the line of the fuselage. A tapered wing section can be conveniently formed by confining all channel sections within the cross sectional envelope of the leading edge channel at the tip ends by means of a guide strap or pin/slot arrangement that will be subsequently discussed. The channel sections can be arranged to swing either forward or aft for stowage as is convenient. In conventional aircraft it would be desirable to have the wings rotate aft and the tail surfaces rotate forwardly for stowage in order to minimize center body length and establish a maximum mass and aerodynamic balance when the surfaces are deployed.

This novel folding airfoil system can form high strength lifting surfaces having considerably greater planform area than previous folding wing systems and having less stowage volume in the folded position. Torsional rigidity, approaching that of a rigid airfoil surface, is inherent in the tapered airfoil embodiment because all of the channels are tightly nested and restrained at the tip so that counteracting interference between channel sections is immediately established whenever a twisting moment is applied to the section. The new folding airfoil system comprises simple sheet-metal channel sections which are economical to produce. Furthermore, trailing edge control surfaces, such as flaps, can be incorporated into the folding airfoil system by hinging a portion of the trailing edge channel section at its root support for motion perpendicular to the airfoil surface.

An object of this invention is to provide a foldable airfoil section of high bending and torsional strength and occupying a minimum of space in the stowed and folded position.

Another object of this invention is to provide a folding airfoil system for an aircraft in which the airfoil can be stowed entirely within the fuselage of the aircraft in the retracted position.

A further object of this invention is to provide a tapered airfoil surface for an aircraft which can be folded into and contained within the aircraft fuselage.

Yet still a further object of this invention is to provide a foldable airfoil section incorporating movable control surfaces within the airfoil.

Other objects and features of the invention will be apparent by reference to the following description which is illustrated by the attached drawings in which:

FIG. 4 is a plan view of a tapered airfoil of a configuration type suitable for the wing of the aircraft of FIG. 1 showing the airfoil in the extended flight position.

FIG. 5 is a plan view of representative tip end channel sections of the airfoil of FIG. 4 illustrating a pin and slot arrangement by which the individual airfoil channels are slidably restrained for movement between the extended and retracted positions.

FIG. 6 is a cross sectional view of section 6—6 of FIG. 4.

FIG. 7 is a cross sectional view of section 7—7 of FIG. 4.

FIG. 8 is a plan view of a tapered airfoil of a configuration suitable for the horizontal or vertical tail surface of the aircraft illustrated in FIG. 1 with the airfoil in the retracted position for stowing.

FIG. 9 is a plan view of the airfoil surface of FIG. 8 in the extended position.

FIG. 10 is a cross sectional view of section 10—10 of FIG. 9.

FIG. 11 is a cross sectional view of section 11—11 of FIG. 9.

FIG. 12 is a perspective view of a rectangular shaped, foldable airfoil.

Figure 6A:
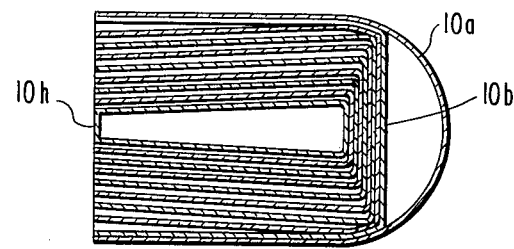
FIG. 6A is a cross section of the root sections of the wing channel sections of FIG. 4 in the retracted and stowed position.

The foldable airfoil, illustrated as a wing in FIGS. 4–7, comprises a plurality of generally C-shaped, hollow metal channels 10a – 10h in which each of the channels is nestable within the next forward channel beginning at the airfoil trailing edge, such that in the stowed position each channel section can be nestingly contained within the next channel in the direction of the leading edge of the airfoil. As can best be seen in FIGS. 6 and 6A the cross sectional shape of all channel sections is such that in the stowed position all can be nestably contained within the cross sectional envelope of the leading edge channel 10a. Obviously, all channel sections forwardly of the trailing edge channel must be hollow in cross section to accommodate the rear channel sections nestable within them. Each of the channel sections 10a – 10h are pivotally connected by hinge pins 11 at spaced intervals to an extension 12 of a fuselage structural spar 13. The spacing of the channel sections 10a – 10h is such that in the extended position of the airfoil the rear portions of each channel section, starting with the leading edge channel, overlie the forward portions of each subsequent channel toward the trailing edge, as best seen in FIG. 6.

In the tapered wing configuration of FIG. 4 the outer tip end of each channel section is nestably contained within the next forwardly located channel section, both in the extended position of FIG. 4 and in the fully retracted position (not illustrated). The confinement of the tip ends of the channel sections can be achieved through the pin and slot arrangement illustrated in FIG. 5. In this arrangement a wing pin 14 extends through apertures 15a – 15h in the end portions of each of the channel sections 10a – 10h, in which the aperture 15a in the leading edge channel section 10a conforms to the wing pin cross section and the apertures of successive channel sections toward the trailing edge constitute elongated slots shaped such that the wing pin retains the tip ends of the respective channel sections in a nesting condition as the channel sections are rotated rearwardly about their respective hinge pins 11 to the fully retracted position in which all channel sections extend along a common line in alignment with the line of hinge pins 11 with the cross sectional areas of all channels subsequent to the leading edge channel 10a being nested within that of the leading edge channel section 10a in the manner of the tail surface airfoil illustrated in FIG. 8 which is subsequently described. In the retracted position the wing pin 14 would be at the left end portion of each of the slots 15b – 15h in lieu of the right portion of each of the slots as illustrated in FIG. 5 which represents the pin positions for the wing with the channel sections in the extended position. However, any type of tip end confinement guiding structure could be utilized that permits the channel ends to be confined in a nesting arrangement and slide relative to each other along their length as they rotate between the retracted and extended positions.

An actuating rod 15' is connected to the root end of the leading edge channel 10a by the connecting links 16 and 17 and the hinge pins 18 and 19. The connecting rod 15' is supported in the fuselage spar extension 12 for movement parallel to the line of wing hinge pins 11 so that, when the actuating rod 15' is moved forwardly from the wing extended position illustrated in FIG. 4, the leading edge channel section 10a is rotated rearwardly toward the trailing edge channel section 10h and all other channel sections are similarly rotated rearwardly about their respective hinge pins 11 to the folded position as the outer tip wing pin 14 slides along the slots 15b – 15h. Movement of the actuating rod 15' to compress the spring 20 may be achieved through various power devices, such as a hydraulic or pneumatic cylinder, the spring arrangement of FIG. 4 being but one obvious arrangement. In FIG. 4 the lower end of the compression spring 20 contained within the housing cavity 21 in the spar extension 12 is affixed to a collar 22 of the actuating rod 15'. When the wing channel sections 10a – 10h are rotated from their extended position shown in FIG. 4 to the retracted or folded position and nested within each other in alignment with the wing channel hinge pins 11, the actuating rod 15' and its collar 22 move forwardly within the housing cavity 21 compressing the spring 20. The actuating rod 15' and compressed spring 20 may be conveniently retained in that position by means of a pin engaging the detent 23 in the lower end of the actuating rod. At such time as the wing is to be deployed from its folded to extended position, the pin is pulled out of the detent 23 and the actuating rod moves rearwardly by the force of the compression spring 20 causing the wing channel sections 10a – 10h to be rotated forwardly to the fully extended position illustrated in FIG. 4 by the movement of the actuating rod 15' and connecting links 16 and 17.

Figure 1:
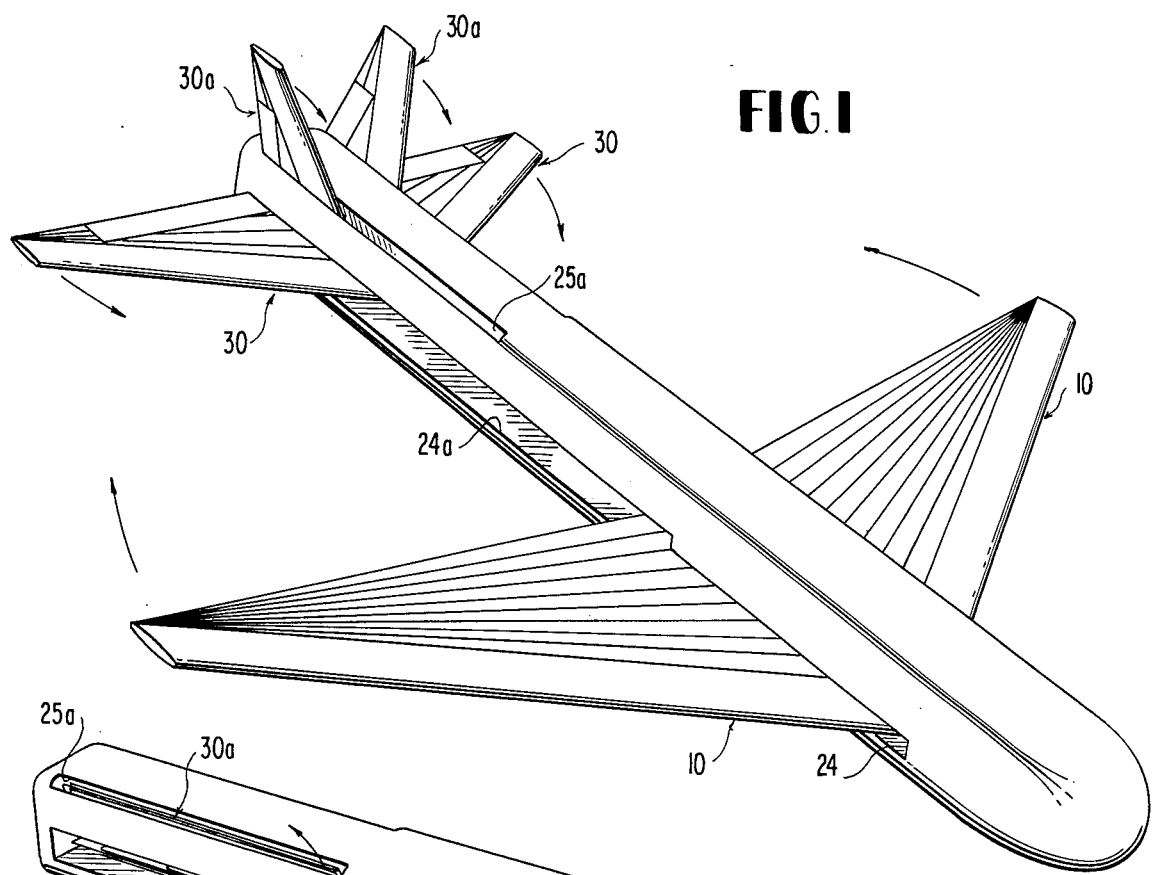
FIG. 1 is a perspective view of an aircraft with the foldable airfoils in the extended position.
Figure 2:
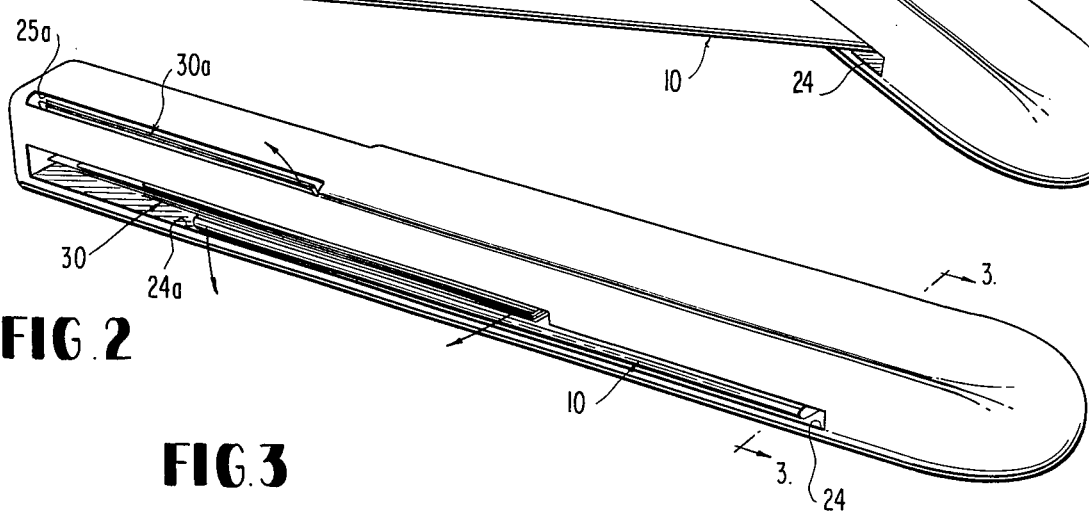
FIG. 2 is a view of the aircraft of FIG. 1 with the airfoils folded in a stowed position within the aircraft fuselage.
Figure 3:
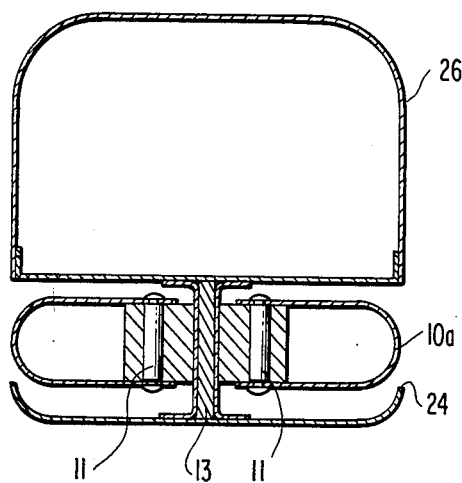
FIG. 3 is a cross sectional view of section 3—3 of FIG. 2.

The channel sections of the foldable airfoil can be arranged to swing either forwardly or rearwardly for stowage depending upon their location on the aircraft. For conventional aircraft configurations it would generally be desirable to have the wing sections rotate rearwardly and the tail surfaces to rotate forwardly for stowage as is illustrated in FIGS. 1 and 2 which will be subsequently discussed.

FIGS. 8–11 illustrate a foldable tail surface configuration which can swing forwardly. As in the case of the foldable wing illustrated in FIG. 4, the foldable airfoil of FIGS. 8 and 9 comprises hollow channel sections 30a – 30d in which each channel section from the trailing sections 30d – 30d' are each nestable within the next forward channel section, with all channel sections being containable within the envelope of the leading edge channel 30a similar to the illustration of FIG. 6A when the airfoil is in the retracted position illustrated in FIG. 8.

As in the case of the foldable wing of FIG. 4, each of the root ends of the channel sections 30a – 30d' are pivotally connected by hinge pins 31 to an extension 33 of a fuselage structural spar 34 extending along the longitudinal groove 32 within the spar extension 33. The forwardly rotating channel sections of FIGS. 8–11 require the indicated female support arrangement in lieu of the male supporting arrangement of the configuration of the rearwardly foldable wing of FIG. 4. In this tail surface configuration the outer ends of each of the channel sections are slidably contained and nested within the confines of the envelope of the leading edge channel 30a in both the extended and retracted positions by means of any convenient means, such as the pin and slot arrangement of FIG. 5, or could constitute a collar 35 around the end of the leading edge channel section 30a, which would be particularly suitable if the channel sections were rear folding as in FIG. 4. In the illustrated configuration notched, cut-out sections are made in the trailing edges of the various channel sections, as illustrated by the dotted lines defining these cut-out sections in FIG. 8, in order to accommodate movement of the trailing edge control surface 30d subsequently described. In lieu of the actuating rod 15' utilized in the wing arrangement of FIG. 4 for moving the airfoil from its retracted position to the extended position, an actuating spring 35' is installed around the hinge pin 31 of channel section 30a with the respective ends of the spring lying along the forward edge of forward channel section 30a and the surface of the spar extension 33 within the cavity 32. Rotation of the channel sections forwardly to the retracted position of FIG. 8 compresses the spring 35' and the channel sections may be retained in the retracted position by means of a locking pin 36 that is movable into and out of engagement with the leading edge channel section 30a. Upon releasing the locking pin 36, the spring 35' would rotate the channel sections 30a – 30d rearwardly to the fully extended position of FIG. 9.

The tail surface configuration of FIGS. 8-11 contains provisions for a movable control surface 30d' in the trailing edge of the airfoil in which the movable surface can serve the function of a movable elevator or rudder surface, a wing flap, etc. To make provisions for the trailing edge movement surface the trailing edge channel section is divided into two sections in which the movable inner section 30d' is pivotally connected by the pin 37 to the outer segment of the channel section 30d to be rotatable upwardly and downwardly with respect to the remaining channel sections comprising the airfoil. The root section of the control surface channel section 30d' is pivotally connected by the hinge pin 31 to a fuselage spar extension 33' that is pivotally connected to the fuselage structural spar 34 by the spar pin 37. A control surface actuator 38 is connected to the after rotatable spar extension 33' by the links 39 and 40 and the hinge pins 41 for rotation of the rear spar extension 33' and the trailing edge control surface 30d' about the spar hinge pin 37 upon movement of the actuator 38.

A folding airfoil system having a rectangular plan form, in lieu of the tapered arrangement previously described, is illustrated in FIG. 12. As before, the airfoil comprises the nestable channels 50a – 50d of which the root sections are pivotally connected to an extension 51 of a fuselage structural spar 52 by the hinge pins 53. The outer ends of each of the channel sections 50a – 50d extend within a longitudinal groove of the retaining bar 55 and are pivotally connected by hinge pins 54 to the retaining bar with the channel sections 50a – 50d being parallel in the extended position to establish the rectangular plan form of the airfoil. The dotted lines in FIG. 12 illustrate the nesting position which the channel sections 50a – 50d assume when rotated rearwardly to the retracted position in line with the hinge pins 53. Obviously the male or female type of pin arrangement utilized for the root support and the outer tip retention depends upon whether the foldable sections are being rotated forwardly or rearwardly with respect to the fuselage.

Figure 13:
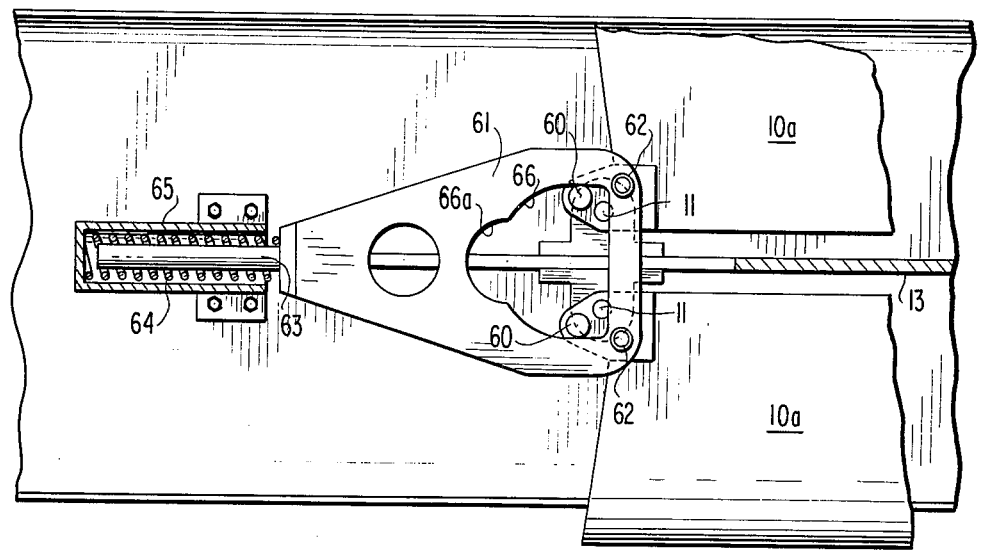
FIG. 13 is a plan view of a cam system for extending and retracting the foldable airfoil of FIG. 4 with the airfoil in the retracted position.
Figure 14:
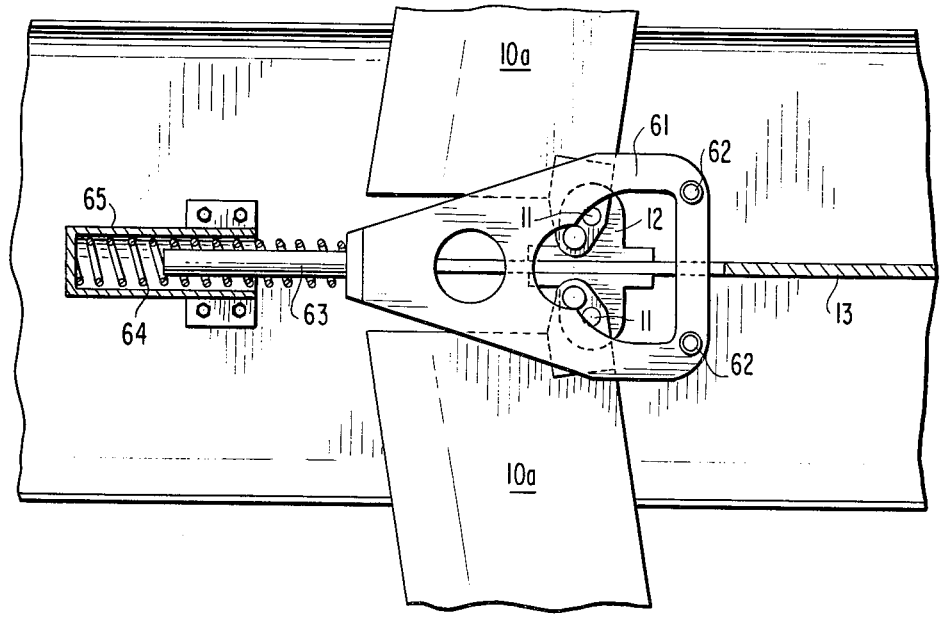
FIG. 14 is a plan view of the cam system of FIG. 13 with the airfoil in the extended position.
Figure 15:
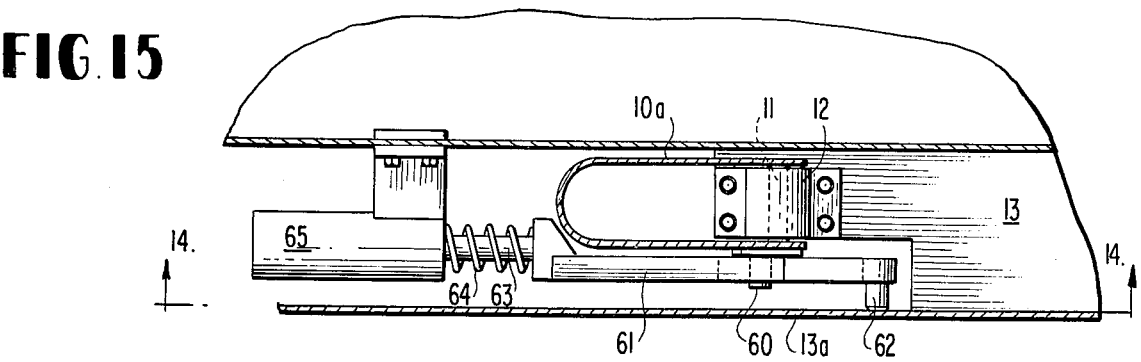
FIG. 15 is a side elevation view of the arrangement of FIG. 14.

FIGS. 13-15 illustrate a camming arrangement which could be utilized in moving the airfoil channel sections from the nesting retracted position to the extended position. Such an arrangement could be utilized as an alternative to the actuating rod 15 and compression spring 20 of the embodiment of FIG. 4 or the root hinge pin springs 31 of the embodiment shown in FIGS. 8 and 9. For illustrative purposes the camming arrangement will be described with reference to the foldable wing channel arrangement of FIG. 4, segments of wing channels being shown for wings on both sides of the fuselage. A drive pin 60 affixed to the lower surface of each of the leading edge channel sections 10a extends downwardly into engagement with the interior of the camming surface 66 of a slidable cam 61 of which the forward portion is supported by the level pins 62 which slidably rest on a horizontal floor extension 13a affixed to the fuselage spar structure 13. A spring guide 63 extends rearwardly from the cam 61 within a compression spring 64 contained within the spring housing 65 and engaging the rear of the cam 61. The forward portion of the camming surface 66 within the cam 61 is shaped to move the drive pin 60 from the position illustrated in FIG. 13 and rotate the leading edge wing channel section 10a about its hinge pin 11 to the extended position illustrated in FIG. 14 upon movement of the cam 61 forwardly under the action of the compression spring 64. The rear portion 66a of the camming surface establishes a locking surface retaining the wings in the extended position. The wing channel sections may be retained in the folded and stowed position with the compression spring locked in the compression condition by means of a conventional locking latch engaging the leading edge channel section 10a in its retracted position.

The arrangement of the foldable wing sections described with reference to FIGS. 4-7 could be utilized as the wing 10 illustrated in the extended position of the aircraft of FIG. 1. The wing nestable channel sections that are pivotally affixed at their root ends to a fuselage structural spar 13 extend through slots 24 which extend longitudinally of the aircraft along the outer skin of the aircraft fuselage. The slots 24 on each side of the aircraft may be conveniently configured such that the rear portion 24a will accommodate both the wings 10 when folded to the retracted position in the direction of the arrows and the horizontal tail surfaces 30 when folded forwardly to the retracted position in the direction of the arrows. Slots 25a in the upper rear portion of the fuselage can accommodate the forward folding of the vertical tail surfaces 30a in the direction of the arrows in FIG. 1. The aircraft would be normally stowed for operation with the airfoil surfaces folded and retained inside the aircraft fuselage as illustrated in FIG. 2. Thus all airfoil sections are contained within the envelope of the aircraft fuselage outer skin structure 26. After launching the aircraft with its airfoil surfaces contained within the confines of the aircraft fuselage, upon releasing the locking arrangement that retains the airfoils in the folded positions the airfoils unfold and project outwardly through the slots in the fuselage and assume the extended flight positions illustrated in FIG. 1.

While the above describes and illustrates a preferred embodiment of the invention, it should be understood that the invention is not restricted solely to the described embodiments but covers all modifications which should be apparent to those skilled in the art and falls within the scope and spirit of the invention as claimed.

What is claimed is:
1. A foldable airfoil comprising
a plurality of elongated channels each having one end forming a portion of the root area of the airfoil and an outer end opposite said root end,
means for pivotally mounting said root end of each of said plurality of channels on a support base at spaced intervals along the root dimension of said airfoil for pivotal motion of each channel in the plane of the airfoil, each said channel having a cross sectional shape nestably containable within the cross sectional envelope of the next adjacent of the pivotally mounted channels, and means interconnecting the outer ends of each of said plurality of channels for rotational movement of said plurality of channels about their respective root end pivots between (1) an extended position in which the lengthwise dimension of each said channel extends spanwise of the airfoil with portions of adjacent channels overlying and (2) a retracted position in which said plurality of channels are colinear in alignment with the channel root end pivots and the cross sectional area of each of said channels is nestably contained within the envelope of the cross section of an adjaent channel, said interconnecting means including means nestingly containing said outer end of each of said plurality of channels within the envelope of the next adjacent channel in said extended position and during movement between said extended and retracted positions.

2. The airfoil of claim 1 wherein said interconnecting means includes means engaging said channel outer end portions for retaining the cross sectional envelope of said channels in said nesting relationship and for concurrent sliding motion of said channels relative to each other in their lengthwise direction during rotation of said channels about the root pivots during movement between said retracted and extended positions.

3. The airfoil of claim 2 wherein said outer end of each of said channels rearwardly of the airfoil leading edge channel has slots extending lengthwise of the channels and said connecting means includes pinning means extending from said leading edge channel through said slots of the nesting channels in sliding engagement with said slots.

4. The airfoil of claim 1 wherein each said channel has a lengthwise dimension extending spanwise of the airfoil.

5. The airfoil of claim 1 wherein the root end pivotal mounting means of the airfoil trailing edge channel includes means pivotally connecting said trailing edge channel mounting means to said support base for pivotal motion perpendicular to the plane of the airfoil.

6. The airfoil of claim 1 additionally comprising means locking said channels in the retracted position and unlocking them for movement to the extended position.

7. The airfoil of claim 6 additionally comprising means for moving said channels between the retracted and extended positions.

8. The airfoil of claim 1 wherein the trailing edge channel of said airfoil comprises a plurality of segments pivotally connected to one another for pivotal motion of at least one of said segments perpendicular to the plane of the airfoil when in said extended position and means pivotally connecting said at least one segment to said support base for pivotal motion perpendicular to the plane of said channels.

9. The airfoil of claim 8 wherein said at least one segment movable in the plane of said airfoil includes the root end of said trailing edge channel and the root end pivotal mounting means of said trailing edge channel includes means pivotally connecting said trailing edge channel mounting means to said support base for pivotal motion perpendicular to the plane of the airfoil.

10. An aircraft with foldable airfoil surfaces comprising a fuselage having airfoil support beams extending chordwise of the respective airfoils and contained within the fuselage, said airfoil surfaces each comprising a set of plurality of elongated channels each having one end forming a portion of the root area of the airfoil surface and an outer end opposite said root end, means for pivotally mounting said root end of each of said plurality of channels to an airfoil support beam at spaced intervals along the root dimension of said airfoil surface for pivotal motion of each channel in the plane of the airfoil surface, each said channel having a cross sectional shape nestably containable within the cross sectional envelope of the next adjacent of the pivotally mounted channels, means interconnecting the outer ends of each of said plurality of channels for rotational movement of said plurality of channels about their respective root end pivots between (1) an extended position in which the lengthwise dimension of each said channel extends spanwise of the airfoil surface with portions of adjacent channels overlying and (2) a retracted position in which said plurality of channels are colinear in alignment with the channel root pivots within the envelope of said fuselage and the cross sectional area of each of said channels is nestably contained within the envelope of the cross section of an adjacent channel, said interconnecting means including means nestingly containing said outer end of each of said plurality of channels within the envelope of the next adjacent channel in said extended position and during movement between said extended and retracted positions, the skin of each of said channel sets in its retracted position and through which said set of channels extends in the extended position, means locking each said channel sets in a retracted position, and means unlocking each said channel sets for movement of said channels of each set to the extended position and locking them therein.

* * * * *